United States Patent
Havlir et al.

(10) Patent No.: US 10,467,724 B1
(45) Date of Patent: Nov. 5, 2019

(54) FAST DETERMINATION OF WORKGROUP BATCHES FROM MULTI-DIMENSIONAL KERNELS

(71) Applicant: Apple Inc., Cupertino, CA (US)

(72) Inventors: Andrew M. Havlir, Orlando, FL (US); Jeffrey T. Brady, Orlando, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/896,923

(22) Filed: Feb. 14, 2018

(51) Int. Cl.
| | |
|---|---|
| G06F 12/02 | (2006.01) |
| G06F 9/54 | (2006.01) |
| G06T 1/20 | (2006.01) |
| G06F 9/38 | (2018.01) |
| G06F 15/80 | (2006.01) |

(52) U.S. Cl.
CPC .............. G06T 1/20 (2013.01); G06F 9/3851 (2013.01); G06F 9/3885 (2013.01); G06F 15/803 (2013.01)

(58) Field of Classification Search
CPC ........................................................ G06T 1/20
USPC ......................................................... 345/505
See application file for complete search history.

(56) References Cited

U.S. PATENT DOCUMENTS

| | | | | |
|---|---|---|---|---|
| 7,834,881 B2 * | 11/2010 | Liu | .................. | G06F 9/3012 345/505 |
| 8,044,951 B1 * | 10/2011 | Brown | .................. | G06T 15/005 345/419 |
| 8,056,080 B2 | 11/2011 | Alexander et al. | | |
| 8,516,461 B2 | 8/2013 | Bellows et al. | | |
| 8,760,455 B2 * | 6/2014 | Duluk, Jr. | .................. | G06T 1/20 345/505 |
| 9,772,864 B2 | 9/2017 | Nystad | | |
| 2007/0091101 A1 * | 4/2007 | Huang | .................. | G06F 9/3879 345/506 |

(Continued)

OTHER PUBLICATIONS

Automatic Bounding of Programmable Shaders for Efficient Global Illumination, ACM SIGGRAPH Asia 2009, Edgar Velazquez-Arnnendariz Shuang Zhao Milos Hassan Bruce Walter Kavita Bala Cornell University.*

(Continued)

*Primary Examiner* — Javid A Amini
(74) *Attorney, Agent, or Firm* — Meyertons, Hood, Kivlin, Kowert & Goetzel, P.C.

(57) ABSTRACT

Techniques are disclosed relating to dispatching compute work from a compute stream. In some embodiments, workgroup batch circuitry is configured to select (e.g., in a single clock cycle) multiple workgroups to be distributed to different shader circuitry. In some embodiments, iterator circuitry is configured to determine next positions in different dimensions at least partially in parallel. For example, in some embodiments, first circuitry is configured to determine a next position in a first dimension and an increment amount for a second dimension. In some embodiments, second circuitry is configured to determine at least partially in parallel with the determination of the next position in the first dimension, next positions in the second dimension for multiple possible increment amounts in the second dimension. In some embodiments, this may facilitate a configurable number of workgroups per batch and may increase performance, e.g., by increasing the overall number of workgroups dispatched per clock cycle.

20 Claims, 7 Drawing Sheets

(56) References Cited

U.S. PATENT DOCUMENTS

| | | | | |
|---|---|---|---|---|
| 2009/0251476 | A1* | 10/2009 | Jiao | G06F 9/383 |
| | | | | 345/543 |
| 2011/0314444 | A1* | 12/2011 | Zhang | G06F 8/45 |
| | | | | 717/106 |
| 2012/0092353 | A1* | 4/2012 | Paltashev | G06T 9/00 |
| | | | | 345/522 |
| 2013/0002689 | A1* | 1/2013 | Panneer | G06T 1/20 |
| | | | | 345/506 |
| 2013/0141443 | A1* | 6/2013 | Schmit | G06F 8/41 |
| | | | | 345/505 |
| 2013/0198494 | A1* | 8/2013 | Grover | G06F 8/53 |
| | | | | 712/226 |
| 2015/0035841 | A1* | 2/2015 | Havlir | G06T 1/20 |
| | | | | 345/505 |
| 2015/0269065 | A1* | 9/2015 | Bourd | G06F 9/54 |
| | | | | 711/155 |
| 2016/0148335 | A1* | 5/2016 | Huang | G06T 1/20 |
| | | | | 345/501 |
| 2016/0179490 | A1* | 6/2016 | Lee | G06F 8/447 |
| | | | | 717/146 |
| 2016/0247310 | A1* | 8/2016 | Hui | G06T 1/20 |
| 2017/0263040 | A1* | 9/2017 | Surazhsky | G06T 15/005 |

OTHER PUBLICATIONS

Design of a Fully Programmable Shader Processor for Low Power Mobile Devices, Woo-Young Kim et al., 2009 IEEE.*

* cited by examiner

US 10,467,724 B1

FAST DETERMINATION OF WORKGROUP BATCHES FROM MULTI-DIMENSIONAL KERNELS

BACKGROUND

Technical Field

This disclosure relates generally to graphics processors and more specifically to techniques for dispatching compute work from a compute stream.

Description of the Related Art

Given their growing compute capabilities, graphics processing units (GPUs) are now being used extensively for large-scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations.

Compute work is often specified as kernels that are multi-dimensional aggregations of compute workgroups. For a three-dimensional kernel, for example, the kernel may have a number of workgroups in each of the x, y, and z dimensions. To increase performance, it may be useful to increase the number of workgroups per cycle dispatched from a kernel to another graphics block e.g., for eventual execution in shader hardware.

Figure 1A:
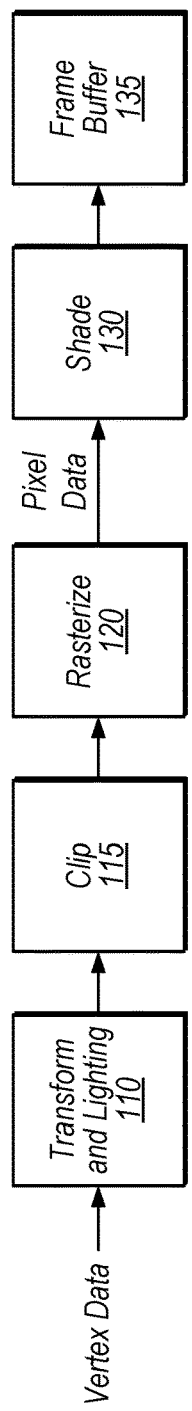
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "shader pipeline configured to process graphics data" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 1B:
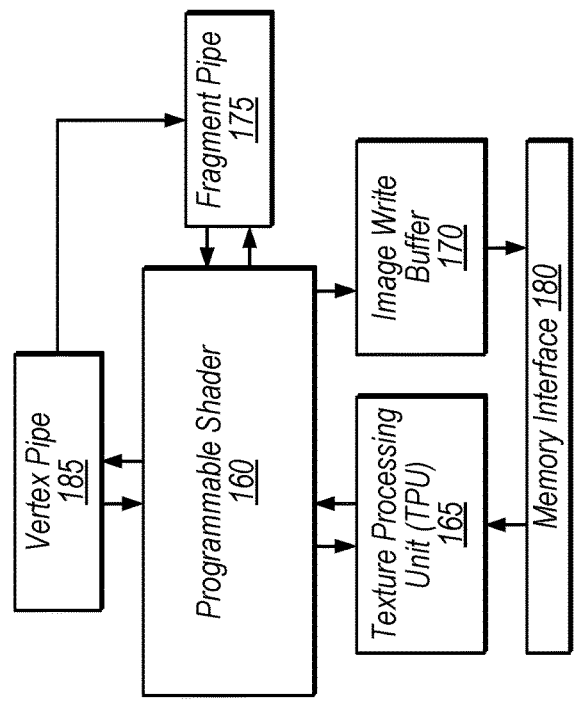
FIG. 1B is a block diagram illustrating one embodiment of a graphics unit.
Figure 2:
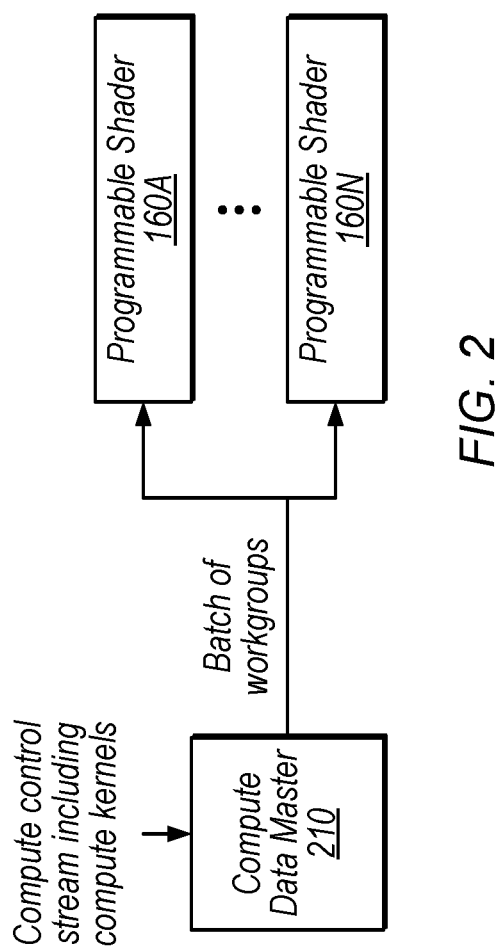
FIG. 2 is a block diagram illustrating an exemplary compute data master configured to select batches of workgroups for processing by shader circuitry, according to some embodiments.
Figure 3:
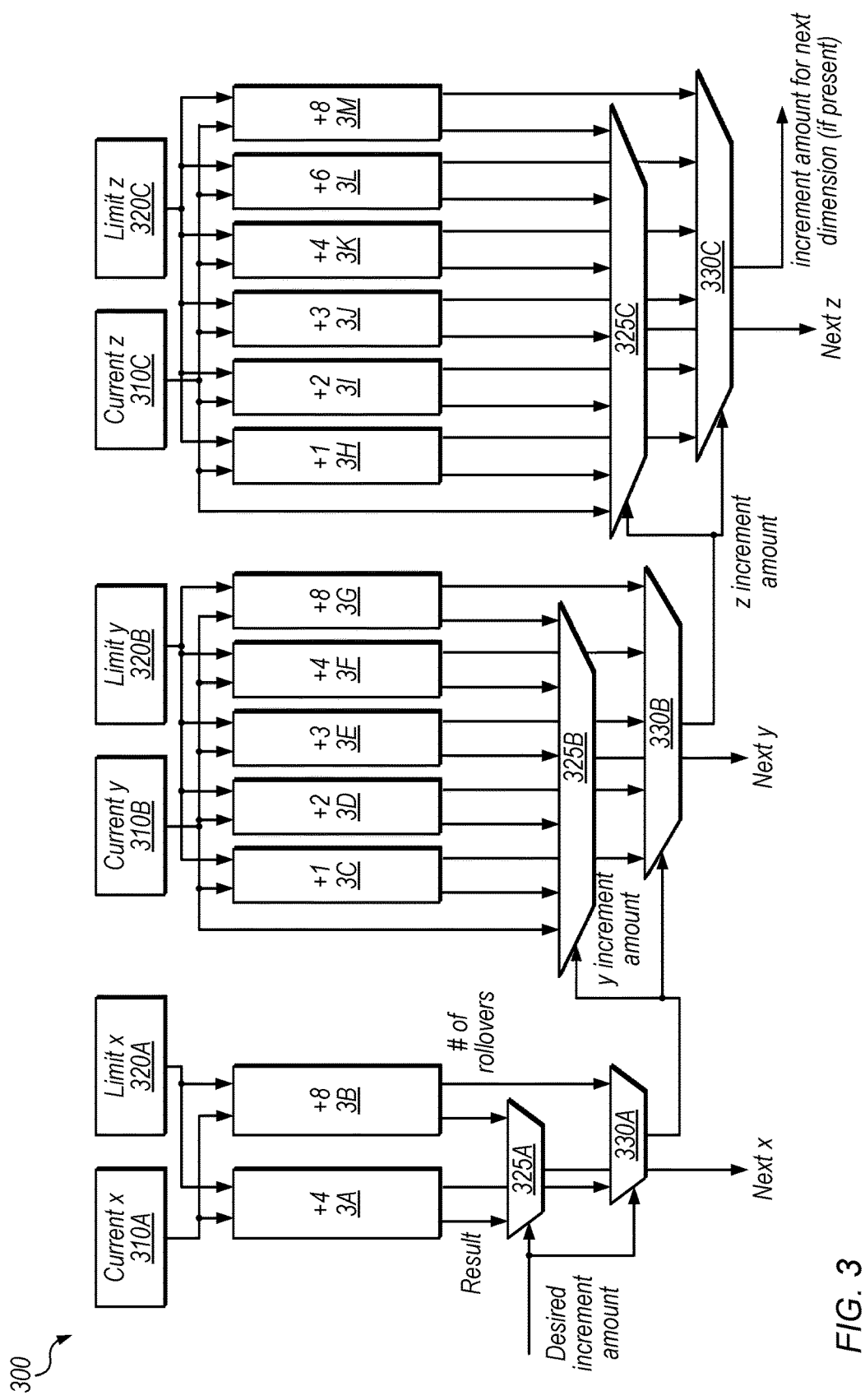
FIG. 3 is a block diagram illustrating exemplary parallel circuitry for determining increment amounts in multiple dimensions, according to some embodiments.
Figure 4:
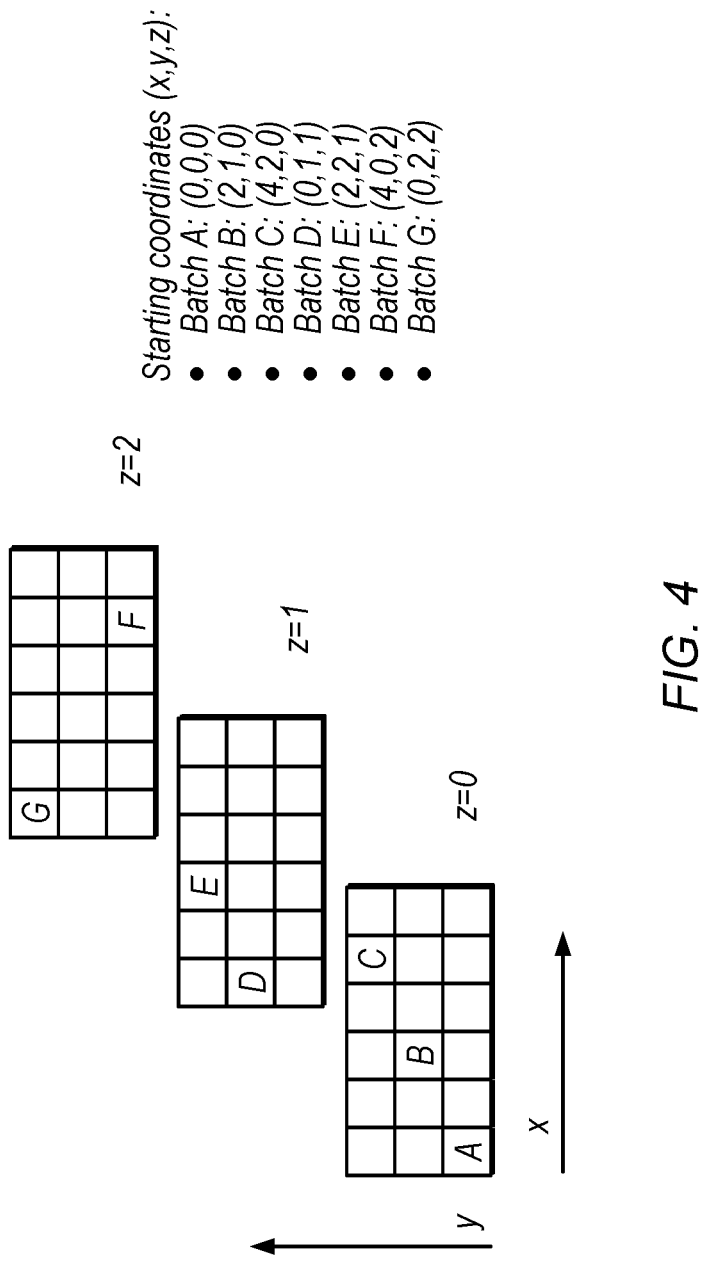
FIG. 4 is a diagram illustrating selection of batches from an example three-dimensional kernel, according to some embodiments.
Figure 5:
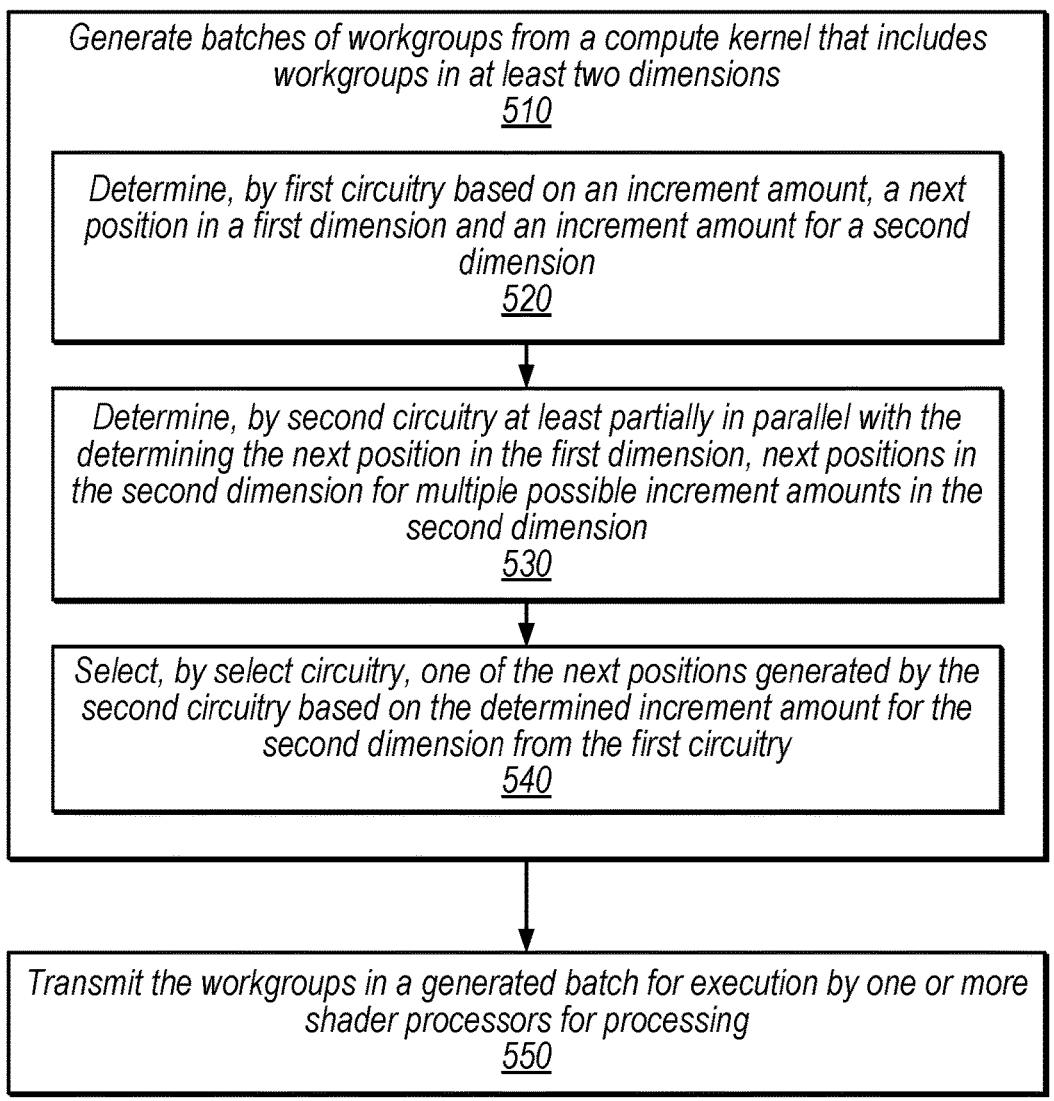
FIG. 5 is a flow diagram illustrating an exemplary method for generating batches of compute workgroups, according to some embodiments.
Figure 6:
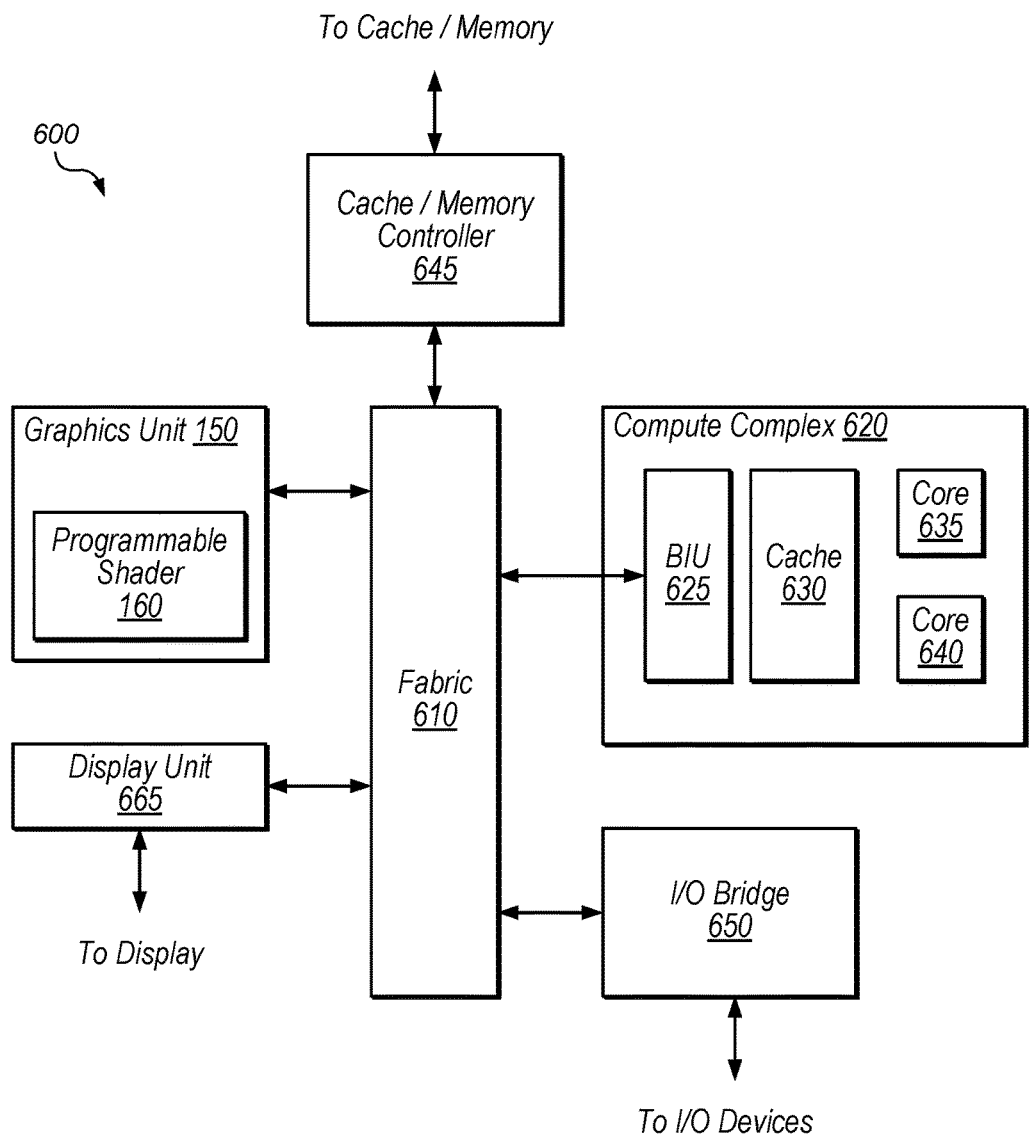
FIG. 6 is a block diagram illustrating one embodiment of a device that includes a graphics unit.
Figure 7:
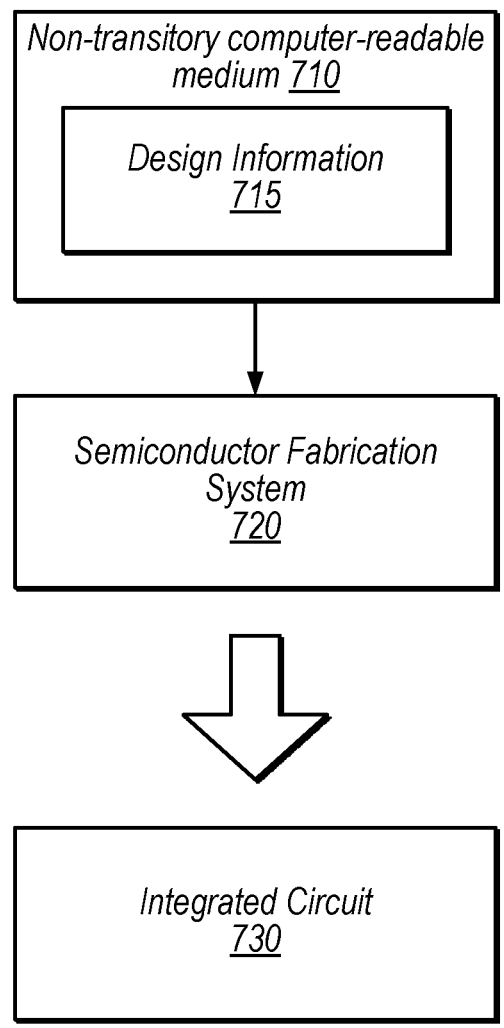
FIG. 7 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2 illustrates an exemplary compute data master that may include circuitry configured to determine offsets in multiple dimensions for a batch of compute workgroups, e.g., as shown in FIG. 3. FIG. 4 illustrates example batches for a three-dimensional kernel. FIG. 5 illustrates an exemplary method, FIG. 6 illustrates an exemplary device, and FIG. 7 illustrates an exemplary computer-readable medium. In various embodiments, the disclosed techniques may improve performance of a graphics processor, e.g., by enabling single-cycle determination of coordinates for the next batch of workgroups to be sent for execution.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview and Examples of Compute Control Stream

FIG. 2 is a block diagram illustrating an exemplary compute data master 210 configured to receive a compute control stream that includes compute kernels and distribute corresponding compute work to various graphics shaders in programmable shader 160 (or multiple programmable shaders 160A-160N), according to some embodiments. In some embodiments, arbitration circuitry (not explicitly shown) is configured to arbitrate between different data masters. For example, a pixel data master and a vertex data master may also send work to programmable shader 160 and the arbitration circuitry may assign resources to those data masters and to compute data master 210. In the illustrated embodiment, the compute control stream includes compute kernels, but it may also include other commands, e.g., for control flow.

In some embodiments, compute data master 210 is configured to send different workgroups to different shader circuitry, e.g., so that the shader circuitry can process the workgroups in parallel. In some embodiments, it may be desirable to dispatch multiple workgroups per clock cycle, e.g., to improve overall performance. In other embodiments, compute data master 210 may dispatch workgroups to other types of graphics elements (e.g., to distributed compute data master circuitry that is configured to send workgroups to shader hardware).

FIG. 3 is a block diagram illustrating exemplary circuitry 300 configured to generate workgroup coordinates for batches of workgroups, according to some embodiments. In some embodiments, circuitry 300 is included in compute data master 210. In the illustrated embodiment, circuitry 300 is configured to generate coordinates for a next batch in three dimensions: x, y, and z. In other embodiments, fewer dimensions (e.g., two) or a greater number of dimensions (four or more) may be implemented using similar techniques. The disclosed dimensions are included for purposes of illustration but are not intended to limit the scope of the present disclosure.

Circuitry 310A-310C, in the illustrated embodiment, stores the current coordinate in the x, y, and z dimensions respectively. The current coordinate indicates where compute master 210 should begin selecting workgroups for the current batch, in some embodiments.

Registers 320A-320C, in the illustrated embodiment, store the limit for each of the dimensions based on the size of the kernel. For example, for a kernel that has three workgroups in the x direction, four in the y direction, and five in the z direction, registers 320 store corresponding values, in some embodiments (e.g., 2, 3, and 4 in embodiments that start counting at zero). In some embodiments, the limit value is used to determine when to rollover when incrementing a particular coordinate.

Increment circuit blocks 3A and 3B, in the illustrated embodiment, are configured to increase the current value of x by +4 and +8 respectively. In other embodiments, any of various increment amounts may be implemented and selectable using the desired increment amount input to multiplexer (MUX) 325A. In some embodiments, the desired increment amount corresponds to the number of workgroups per batch. Note that if the increase results in a position greater than the limit indicated by register 320, the value may rollover one or more times. For example, if the current x is 2, the limit for x is 6, and +8 is selected, the next x coordinate would be 3, with one rollover. If the current x is 0, the limit is 1 and +4 is selected, the next x coordinate would be 0 with two rollovers. In the illustrated embodiment, the circuitry 3A and 3B is configured to output the next x value based on the selected increase and also indicate the number of rollovers. The proper next position and number of rollovers is selected by MUXes 325A and 330A. In the illustrated embodiment, the selected number of rollovers indicates the y increment amount for the current batch, which is then used to select from the inputs of MUXes 325B and 330B.

As shown, in some embodiments, the next position in the y dimension is determined at least partially in parallel with determination of the next position in the x dimension. For example, increment circuit blocks 3C-3G, in the illustrated embodiment, are configured to determine next y and rollover values for multiple different y increment amounts (+1, +2, +3, +4, and +8, in the illustrated example) corresponding to different potential y increment amounts (e.g., numbers of rollovers in the x dimension). MUXes 325B and 330B are then configured to output the selected next y and a z increment amount based on the y increment amount from MUX 330A, as shown. Thus, in various embodiments, circuitry 3C-3G is configured to operate at least partially in parallel with circuitry 3A and 3B. This circuit design may reduce the overall time needed to determine all coordinates for a batch, in various embodiments, which may advantageously improve GPU performance (e.g., by increasing the number of workgroups processed per cycle). In various embodiments, the disclosed techniques may facilitate dispatching batches of workgroups with multiple workgroups in multiple dimensions (e.g., multiple workgroups in the x dimension and multiple workgroups in the y dimension) in a single cycle (although other batches may include multiple workgroups in only the x dimension, for example). Generally, the number of dimensions included in a given batch may depend on the batch size and dimensions of the kernel, for example. The disclosed techniques may also facilitate implementation of an adjustable number of workgroups per batch.

In the illustrated embodiment, circuit blocks 3H-3M are similarly configured to generate next positions in the z dimension based on the current z and z limit at least partially in parallel with the operations of circuit blocks 3A-3G and MUXes 325C and 330C are configured to select their appropriate input based on the z increment amount (corresponding to the number of rollovers in the y dimension). In the illustrated embodiment, the increment amount for the next dimension is output from MUX 330C. In embodiments in which Z is the last dimension, MUX 330 may be omitted and circuit blocks 3H-3M may not output a number of rollovers. Similar techniques may be used for any number of additional dimensions.

In some embodiments, power control circuitry (not explicitly shown) may be configured to control power to at least a portion of the circuit blocks 3A-3M based on one or more limit values. For example, if the limit for the x dimension is eight and +8 is the largest available increment value, then x can rollover at most once per batch and circuit blocks 3D-3G and 3I-3M may be placed in a low power state (e.g., power gated). In the illustrated embodiment, one or more of circuit blocks 3I-3M may also be power gated based on the limit in the y dimension. These power control techniques may reduce power consumption without reducing performance.

In various embodiments, the last batch from a kernel may include a smaller number of workgroups. For example, if the configured number of workgroups per batch is eight, but the kernel only has three workgroups left, the last batch would include only three workgroups. In some embodiments, circuitry is configured to determine the number of workgroups in the last batch to properly dispatch these workgroups. In some embodiments, the graphics unit is configured to detect the last batch by detecting an overflow in the last dimension, e.g., a next z greater than the limit z 320C in the embodiment of FIG. 3.

In some embodiments, the graphics unit determines the number of workgroups in the last batch for a three-dimensional kernel as wg_left_in_x_dim+ (wg_in_x*num_rows_left_in_y_dim)+ (wg_in_x*wg_in_y*num_planes_left_in_z_dim). The graphics unit may determine the number of elements (e.g., workgroups (wg), rows, planes, etc.) left in a particular dimension as the limit value in that dimension minus the current position in that dimension, for example. The wg_in dimension value may correspond to the limit value. In some embodiments, this determination for the last workgroup may be performed using a greater number of cycles than other workgroups (e.g., multiple cycles where the other workgroup coordinates are determined in a single cycle). Because this calculation takes place at the end of the kernel, however, this may not substantially affect performance.

FIG. 4 is a diagram illustrating exemplary coordinates for batches of workgroups from a three-dimensional compute kernel. In the illustrated embodiment, the kernel includes six workgroups in the x dimension, three workgroups in the y dimension, and three workgroups in the z dimension. Thus, the x coordinate can range from 0 to 5 with a limit value of 5 while the y and z coordinates can range from 0 to 2 with a limit value of 2, for this example.

In the illustrated example, circuitry 300 generates batches with eight workgroups in each batch. In various embodiments, the number of workgroups per batch may vary or may be configurable. For the first batch, the initial coordinates are (0,0,0) in the illustrated example (using the format (x,y,z)).

In the illustrated example, the next x coordinate is two (with one rollover), the next y coordinate is one (selected based on the rollover in the x-dimension), and the next z coordinate remains zero for batch B. The coordinates are similarly updated for batch C and so on. Note that for batch D, the z coordinate is one based on a rollover in the y dimension. Although there are no batches with multiple roll-overs in a given dimension, this situation could occur for kernels of different sizes and/or a larger number of workgroups per batch.

Exemplary Method

FIG. 5 is a flow diagram illustrating an exemplary method 500 for generating multi-dimensional batches of workgroups from a compute kernel, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, workgroup batch circuitry (e.g., circuitry 300) generates batches of workgroups from a compute kernel. In the illustrated embodiment, the compute kernel is a structure that includes workgroups in at least two dimensions, e.g., an x dimension and a y dimension (although the kernel structure may include additional dimensions in various embodiments). In the illustrated embodiment, this includes performing method elements 520-540.

At 520, in the illustrated embodiment, first circuitry (e.g., element 3A or 3B of FIG. 3) determines, based on an increment amount, a next position in a first dimension and an increment amount for a second dimension. The increment amount for the second dimension may correspond to a number of rollovers in the first dimension. The increment amount may be fixed in a given design or may be programmable (and thus may vary among different kernels and/or within a kernel). A programmable increment amount may facilitate efficient scheduling, e.g., by adjusting the granularity at which compute kernels send batches for execution when other graphics work is using relatively larger or smaller amounts of execution resources.

At 530, in the illustrated embodiment, second circuitry (e.g., elements 3C-3G of FIG. 3) determines, at least partially in parallel with the determination of the next position in the first dimension, next positions in the second dimension for multiple possible increment amounts in the second dimension. Determining multiple next positions may increase performance by performing at least a portion of the calculations before the first circuitry has determined the actual increment amount in the second dimension.

At 540, in the illustrated embodiment, select circuitry (e.g., MUX 325B) selects one of the next positions generated by the second circuitry based on the determined increment amount for the second dimension from the first circuitry.

At 550, in the illustrated embodiment, the graphics unit transmits the workgroups in a generated batch for execution by one or more shader processors for processing. In some embodiments, ones of the workgroups may be sent for execution by different portions of the one or more shader processors. The transmission of workgroups may be performed directly to the shader hardware or to another graphics block (e.g., distributed compute data master circuitry that is configured, in turn, to send workgroups to shader processors). In some embodiments, the elements of FIG. 5 are performed in a single clock cycle. Thus, in these embodiments multiple workgroups may be dispatched per cycle.

In some embodiments, additional circuitry is configured to determine next positions for one or more additional dimensions at least partially in parallel with the first and second circuitry. In some embodiments, the graphics unit converts a specified number of workitems for the compute kernel into a number of workgroups. In some embodiments, the graphics unit generates a batch that includes multiple workgroups in each of the first and second dimensions in a single clock cycle Exemplary Device Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 150, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1B, 2, and/or 3. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    programmable shader circuitry configured to perform operations for different compute workgroups in parallel; and
    workgroup batch circuitry configured to generate batches of workgroups from a compute kernel and send workgroups in a batch for execution by the programmable shader circuitry, wherein the compute kernel is a structure that includes workgroups in at least two dimensions, wherein ones of the different compute workgroups each include a portion of program instructions to be executed for the compute kernel, the workgroup batch circuitry comprising:
        first circuitry configured to determine, based on an increment amount, a next position in a first dimension and an increment amount for a second dimension;
        second circuitry configured to determine, at least partially in parallel with the determination of the next position in the first dimension by the first circuitry, next positions in the second dimension for multiple possible increment amounts in the second dimension; and
        select circuitry configured to select one of the next positions generated by the second circuitry based on the determined increment amount for the second dimension from the first circuitry, wherein the workgroup batch circuitry is configured to generate a subsequent batch of workgroups using the selected next position for the second dimension.

2. The apparatus of claim 1, wherein the compute kernel is a structure that includes workgroups in at least three dimensions, the apparatus further comprising:
    third circuitry configured to determine, at least partially in parallel with the determination of the next position in the first dimension and the determination of the next positions in the second dimension, next positions in a third dimension for multiple possible increment amounts in the third dimension.

3. The apparatus of claim 1, wherein the increment amount in the first dimension is programmable.

4. The apparatus of claim 1, wherein the workgroups each include multiple workitems, the apparatus further comprising:
    circuitry configured to convert a specified number of workitems for the compute kernel into a number of workgroups.

5. The apparatus of claim 1, wherein the first circuitry is configured to receive a current position in the first dimension and a limit for the first dimension as inputs, wherein the limit is based on a size of the compute kernel.

6. The apparatus of claim 1, wherein the apparatus is configured to generate a batch that includes multiple workgroups in each of the first and second dimensions in a single clock cycle.

7. The apparatus of claim 1, further comprising circuitry configured to determine a number of workgroups remaining in the compute kernel for a last batch from the compute kernel.

8. A method, comprising:
    generating, by workgroup batch circuitry, batches of workgroups from a compute kernel, wherein the compute kernel is a structure that includes workgroups in at least two dimensions, wherein ones of the compute workgroups each include a portion of program instructions to be executed for the compute kernel, wherein the generating includes:
        determining, by first circuitry based on an increment amount, a next position in a first dimension and an increment amount for a second dimension;
        determining, by second circuitry at least partially in parallel with the determining the next position in the first dimension by the first circuitry, next positions in the second dimension for multiple possible increment amounts in the second dimension; and
        selecting, by select circuitry, one of the next positions generated by the second circuitry based on the determined increment amount for the second dimension from the first circuitry; and
    transmitting the workgroups in a generated batch for execution by one or more shader processors for processing.

9. The method of claim 8, further comprising:
    determining, by third circuitry at least partially in parallel with the determination of the next position in the first dimension and the determination of the next positions in the second dimension, next positions in a third dimension for multiple possible increment amounts in the third dimension.

10. The method of claim 8, further comprising:
    determining the increment amount in the first dimension based on a programmable parameter.

11. The method of claim 8, wherein the first circuitry receives a current position in the first dimension and a limit for the first dimension as inputs, wherein the limit is based on a size of the compute kernel.

12. The method of claim 8, wherein the determining and selecting are performed in the same clock cycle.

13. The method of claim 8, further comprising determining a number of workgroups remaining in the compute kernel for a last batch from the compute kernel.

14. A non-transitory computer readable storage medium having stored thereon design information that specifies a design of at least a portion of a hardware integrated circuit in a format recognized by a semiconductor fabrication system that is configured to use the design information to produce the circuit according to the design, including:
    programmable shader circuitry configured to perform operations for different compute workgroups in parallel; and
    workgroup batch circuitry configured to generate batches of workgroups from a compute kernel and send workgroups in a batch for execution by the programmable shader circuitry, wherein the compute kernel is a structure that includes workgroups in at least two dimensions, wherein ones of the different compute workgroups each include a portion of program instructions to be executed for the compute kernel, the workgroup batch circuitry comprising:

first circuitry configured to determine, based on an increment amount, a next position in a first dimension and an increment amount for a second dimension;

second circuitry configured to determine, at least partially in parallel with the determination of the next position in the first dimension by the first circuitry, next positions in the second dimension for multiple possible increment amounts in the second dimension; and select circuitry configured to select one of the next positions generated by the second circuitry based on the determined increment amount for the second dimension from the first circuitry, wherein the workgroup batch circuitry is configured to generate a subsequent batch of workgroups using the selected next position for the second dimension.

15. The non-transitory computer readable storage medium of claim 14, wherein the compute kernel is a structure that includes workgroups in at least three dimensions, the circuit further comprising:

third circuitry configured to determine, at least partially in parallel with the determination of the next position in the first dimension and the determination of the next positions in the second dimension, next positions in a third dimension for multiple possible increment amounts in the third dimension.

16. The non-transitory computer readable storage medium of claim 14, wherein the increment amount in the first dimension is different for one or more different compute kernels.

17. The non-transitory computer readable storage medium of claim 14, wherein the workgroups each include multiple workitems, the circuit further comprising:

circuitry configured to convert workitems for the compute kernel into workgroups.

18. The non-transitory computer readable storage medium of claim 14, wherein the first circuitry is configured to receive a current position in the first dimension and a limit for the first dimension as inputs; and wherein the second circuitry is configured to receive a current position in the second dimension and a limit for the second dimension, wherein the limits are based on a size of the compute kernel.

19. The non-transitory computer readable storage medium of claim 14, wherein the circuit is configured to generate a batch that includes multiple workgroups in each of the first and second dimensions in a single clock cycle.

20. The non-transitory computer readable storage medium of claim 14, wherein the circuit further comprises circuitry configured to determine a number of workgroups remaining in the compute kernel for a last batch from the compute kernel.

* * * * *